United States Patent [19]

Hice, Sr.

[11] 4,337,844
[45] Jul. 6, 1982

[54] TREE SUPPORT FOR HUNTERS

[76] Inventor: Robert C. Hice, Sr., Rte. 8, Cumming, Ga. 30130

[21] Appl. No.: 144,201

[22] Filed: Apr. 28, 1980

[51] Int. Cl.³ .................. A01M 31/02; A45F 3/26; A47C 9/10

[52] U.S. Cl. .................. 182/187; 182/133; 108/152

[58] Field of Search .............. 182/187, 188, 133–136; 108/152; 5/130, 127

[56] References Cited

U.S. PATENT DOCUMENTS

| | | | |
|---|---|---|---|
| 1,092,945 | 6/1914 | Frederick | 182/187 |
| 2,394,203 | 2/1946 | Pruder | 182/187 |
| 2,711,783 | 6/1955 | Prill | 182/187 |
| 3,116,808 | 1/1964 | Riley | 182/187 |
| 3,338,332 | 8/1967 | Brantly | 182/187 |
| 3,460,649 | 8/1969 | Baker | 182/187 |
| 3,568,797 | 3/1971 | Hardy | 182/142 |
| 3,730,294 | 5/1973 | Thurmond | 182/187 |
| 3,822,813 | 7/1974 | Carter | 182/187 |
| 3,856,111 | 12/1974 | Baker | 182/187 |
| 3,960,240 | 6/1976 | Cotton | 182/187 |
| 4,022,292 | 5/1977 | Van Gompel | 182/187 |

FOREIGN PATENT DOCUMENTS

67262 4/1892 Fed. Rep. of Germany ...... 182/188

Primary Examiner—Reinaldo P. Machado
Attorney, Agent, or Firm—Jones & Askew

[57] ABSTRACT

A tree-climbing hunter's support apparatus includes a tree-gripping frame section and a collapsible frame section that extends from the tree-gripping section to unfold and support a flexible lounge seat. The positioning of the seat for supporting a hunter provides for a strong and safe tree-gripping lever action to prevent the apparatus from slipping down the tree. The flexible lounge seat permits the hunter to remain safe, comfortable and motionless for long periods. The hunter can climb and descend the tree with the assistance of the apparatus, and can conveniently transport the apparatus on his back.

7 Claims, 4 Drawing Figures

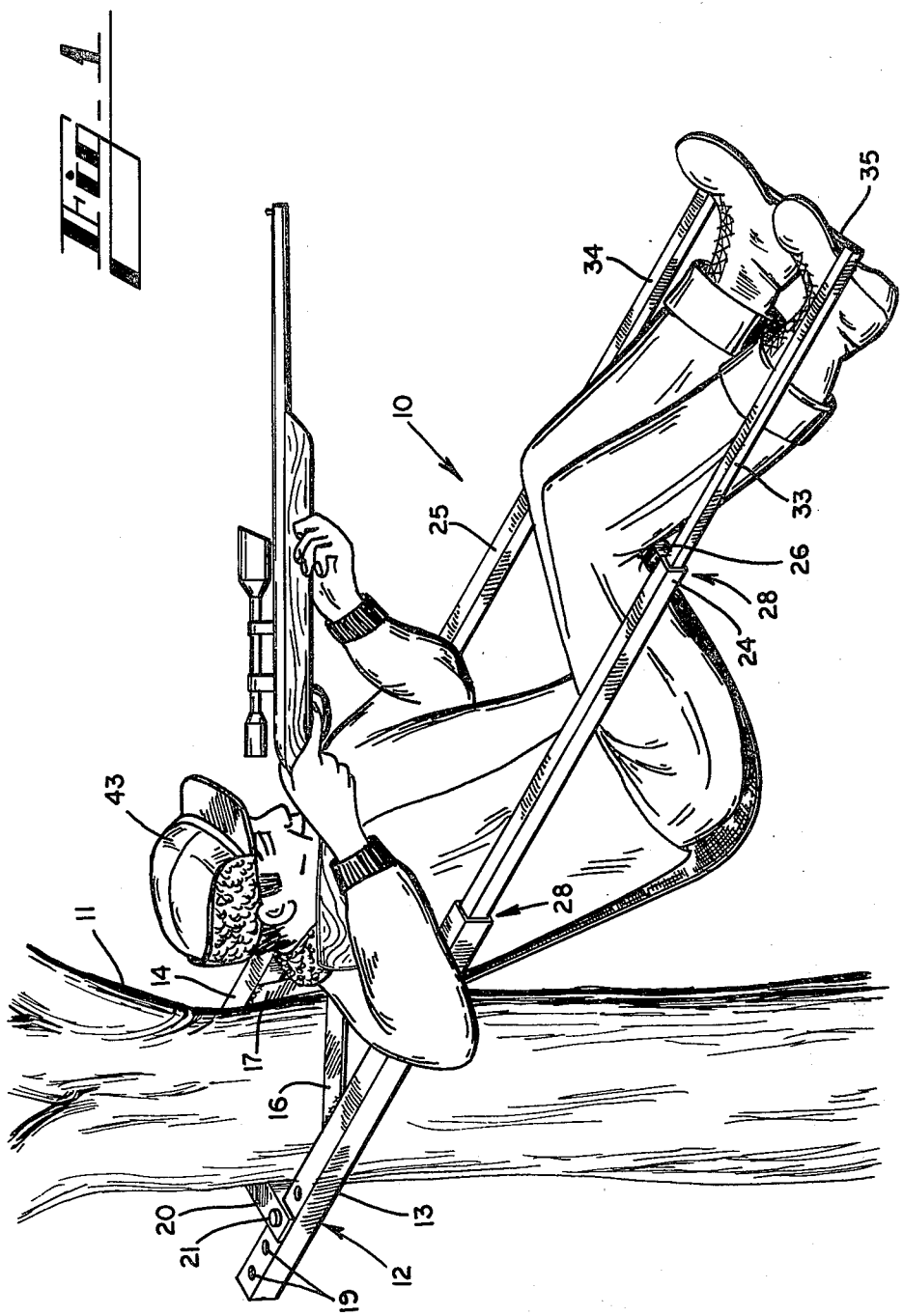

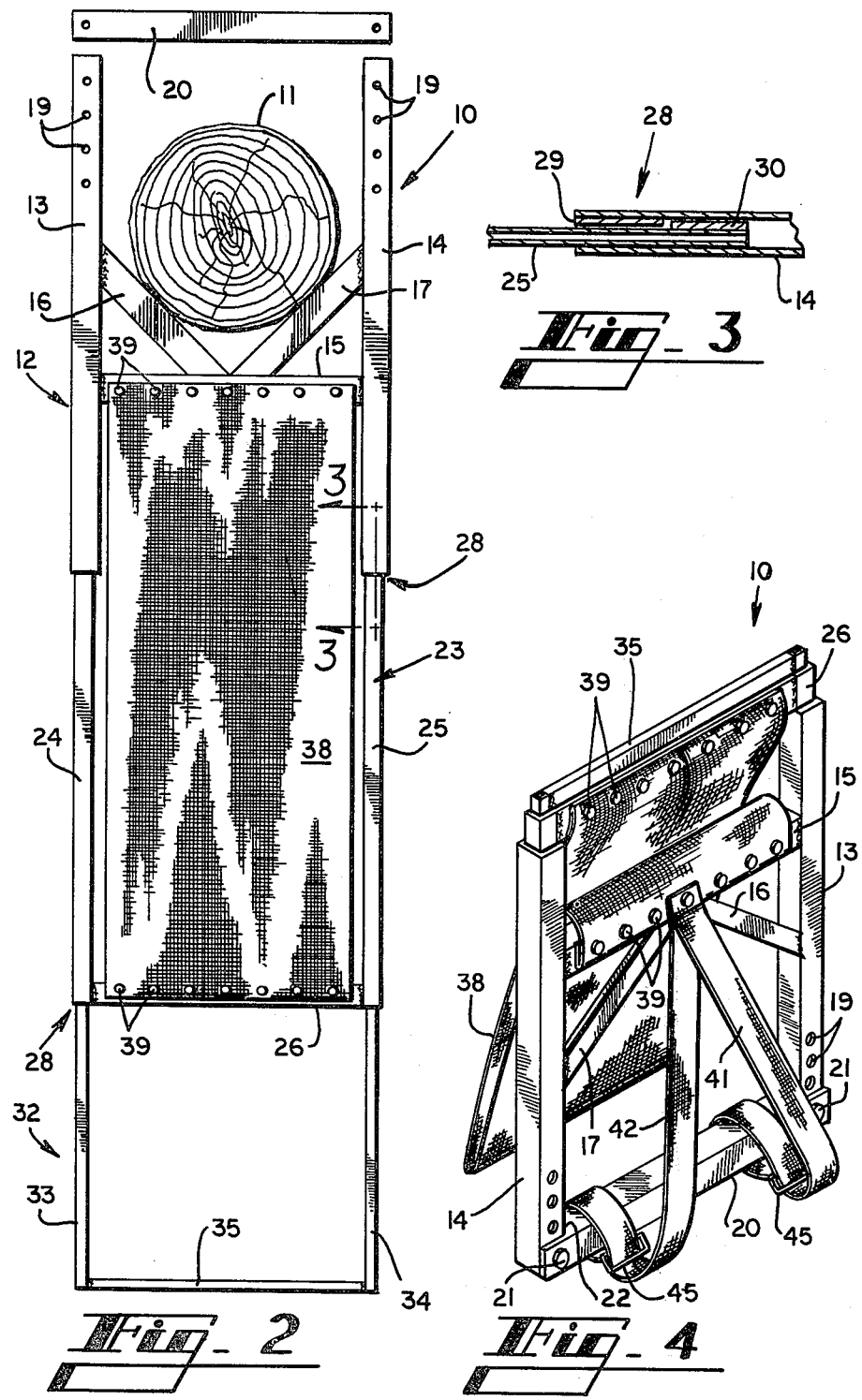

TREE SUPPORT FOR HUNTERS

TECHNICAL FIELD

The present invention relates to devices for supporting a person above the ground on trees, poles and the like, and more particularly relates to a "tree-climbing" device for supporting a hunter above the ground on a tree.

BACKGROUND ART

It has been recognized that an advantage is obtained in deer hunting by occupying a position above the ground and by preventing deer from sensing any motion of a hunter. Such a position avoids the deer's vision, sense of smell and highly developed ability to detect motion. The problem of avoiding discovery by deer was approached by constructing permanent tree stands or blinds, with the obvious disadvantage that the hunter was confined to a single location. Also, attempts were made to provide portable platforms for temporary mounting in trees at an appropriate height. Some such portable devices must be strapped to the tree trunk, and access is gained to them by attaching a portable ladder device to the tree. One such device is shown in U.S. Pat. No. 3,116,808. Installation of such a device is complicated and time consuming, and its several components are not conveniently carried about from tree to tree. Furthermore, the devices are potentially unsafe because of the unsure nature of the attachment of the platform to the tree.

Another type of portable device is shown in U.S. Pat. No. 3,856,111. The device includes a horizontal platform intended to bite into the tree at the inner edge thereof, and an angularly disposed frame that extends upwardly from the outer edge of the platform around the tree at a position above the platform. The weight of the person on the platform is intended to create a lever action to hold the device on the tree trunk. However, such devices have been known to fall out of trees with persons on them because they are not designed to use the weight of the person to maximum advantage in causing the device to bite into the tree. Also, the platform provided is small and hard, and therefore a person standing or sitting thereon soon becomes restless and cannot remain motionless. This lack of comfort is critical because once the hunter begins to move even slightly, the advantage of his elevated position will be largely lost.

SUMMARY OF THE INVENTION

The present invention solves the above described problems of prior support devices by providing a conveniently portable tree support for hunters that is safe, by virtue of increased ability to grip the tree, and comfortable, so as to increase the chance of success of the hunter by allowing the hunter to remain motionless for long periods of time.

Generally described, the present invention is an apparatus for engaging trees and the like for supporting a person above the ground, comprising a means for gripping the tree, a flexible seat, and collapsible means extending from the tree gripping means for supporting the flexible seat. In the preferred embodiment, the tree gripping means is an openable frame section which closes about the upright trunk of a tree and includes an upper tree-engaging brace and a pair of lower tree-engaging cleats, so that the frame section grips the trunk of the tree upon the exertion of downward pressure on the lower tree-engaging cleats. The means extending from the gripping means for supporting the flexible seat is preferably a collapsible frame section that telescopes into the tree gripping frame section for portability and extends therefrom to unfold the flexible seat to allow the person to sit therein. Still another collapsible frame section is preferably provided and extends to provide a foot rest for the person sitting in the flexible seat.

It will be seen that a support device according to the present invention locates the center of gravity of the person utilizing the device both below the points where the tree gripping frame section contacts the trunk of the tree, and also at a point further away from the tree than was the case in previous portable hunting platforms. This provides greater leverage on the tree for increased safety and more space for the person positioned in the flexible seat to load and aim his weapon. The flexible seat supports the hunter in a comfortable reclining or lounging position instead of merely providing a small, hard platform for standing or sitting upon. Therefore, the hunter does not become uncomfortable quickly, and can remain motionless while waiting for deer.

The hunter's support according to the present invention is of the "tree-climbing" type. Means are provided adjacent to the lower tree-engaging member for the hunter to insert his feet and lift the apparatus behind him while grasping the tree with his arms. By alternately standing on the apparatus to grasp the tree and then lifting the apparatus with his feet, the hunter can climb the tree using the apparatus in a manner to be described in more detail below.

Thus, it is an object of the present invention to provide a safe and comfortable apparatus for engaging the trunk of a tree or a pole and supporting a person such as a hunter above the ground.

It is a further object of the present invention to provide a support apparatus for hunters having increased ability to safely grip the trunk of a tree while supporting the hunter above the ground.

It is a further object of the present invention to provide an apparatus for gripping the trunk of a tree with a lever action, the apparatus including a flexible seat extending away from the tree from the tree-gripping portion of the apparatus, to support a hunter in a comfortable manner.

Other features, objects and advantages of the present invention will become apparent upon reading the following specification when taken in conjunction with the drawing and the appended claims.

BRIEF DESCRIPTION OF THE DRAWING

FIG. 1 is a pictorial view of a hunter support apparatus embodying the present invention, shown mounted on a tree and supporting a hunter.

FIG. 2 is a top plan view of a hunter support apparatus embodying the present invention.

FIG. 3 is a cross sectional view of a joint between adjacent frame sections of the apparatus shown in FIG. 2, taken along line 3—3 of FIG. 2.

FIG. 4 is a pictorial view of a hunter support apparatus embodying the present invention, shown in a collapsed position for transport on a hunter's back.

DETAILED DESCRIPTION

Referring now in more detail to the drawing, in which like numerals represent like parts throughout the several views, FIG. 1 shows a hunter support apparatus 10 embodying the present invention, supporting a hunter 43 in a tree 11. Referring to FIG. 1 and FIG. 2, the support apparatus 10 includes a first frame section 12 which is the tree-gripping frame section of the apparatus 10. The frame section 12 includes a pair of parallel tubular arms 13 and 14 rigidly connected in spaced apart parallel relation by a rigid cross member 15 having a length sufficient to permit tree trunks of moderately large diameter to fit between the arms 13 and 14. A pair of tree-engaging cleats are mounted to extend diagonally from the center of the cross-member 15 to opposite points along the parallel arms 13 and 14, respectively. The cleats 16 and 17 serve as lower tree-engaging members and also brace the connection between the cross-member 15 and the arms 13 and 14.

At the ends of the arms 13 and 14 above the "V" formed by the cleats 16 and 17, a plurality of holes 19 are formed through the arms 13 and 14. An upper tree-engaging back brace 20 is provided for attachment to the arms 13 and 14 by means of bolts 21 placed through aligned openings in the back brace 20 and one of the holes 19 of the arms 13 and 14. As illustrated in FIG. 4, the back brace 20 is formed of angle iron which is L-shaped in cross section, and one of the flanges is shortened at its opposite ends so that the back brace includes notches 22 at each end thereof and the longer flanges of the back brace 20 rest on the arms 13 and 14. It will be seen that the back brace 20 functions as an adjustable upper tree-engaging member that can be adjusted by means of the holes 19 closer to or farther from the cleats 16 and 17 in accordance with the diameter of the tree 11 that the hunter desires to climb. The weight of the hunter upon the cross member 15 or any part of the apparatus farther from the tree than the cross member 15, causes the cleats 16 and 17 to bite into the tree and press the back brace 20 into the opposite side of the tree, and to thereby grip the tree by a lever action.

A second or middle frame section 23 is collapsibly mounted to the tubular arms 13 and 14 of the first frame section 12. The second frame section 23 is formed in the shape of a "U", having parallel rectilinear tubular arms 24 and 25 sized and shaped to fit within the hollow centers of the tubular arms 13 and 14. The arms 24 and 25 are rigidly joined at the ends thereof farthest from the first frame section 12 by a cross member 26.

When the arms 24 and 25 are fully extended out of arms 13 and 14, they are held in position at joints 28. The details of joints 28 between the first and second frame sections are shown in cross section in FIG. 3. An outer stop 29 is fixed to the inner surface of the arms 13 and 14 adjacent to the ends thereof. A similar inner stop 30 is fixed to the outer surface of the tubular arms 24 and 25 adjacent to the ends thereof. In assembling the support apparatus 10, the stops 29 and 30 are fixed in their proper positions, the arms 24 and 25 are dropped through the arms 13 and 14, and then the cross member 26 is joined to the arms 24 and 25. The result is an assembly of the second frame section 23 which telescopes almost completely within the first frame section 12 (FIG. 4) and alternately readily extends to an extended position (FIGS. 1 and 2) wherein the stops 29 and 30 within the arms 13 and 14 engage one another (FIG. 3) to prevent further outward movement of the second frame section 23.

In the preferred embodiment shown in FIGS. 1 and 2, a third or outer frame section 32 is telescopically mounted to the second frame section 23 substantially in the same manner that the second frame section 23 is mounted to the first frame section 12. The third frame section 32 includes a pair of parallel arms 33 and 34 sized and shaped to fit within the tubular arms 24 and 25, and rigidly connected at the outer ends thereof by a cross member 35 that serves as a foot rest as shown in FIG. 1. Similar joints 28, on a somewhat smaller scale, are provided between the arms 33 and 34 and the arms 24 and 25, as were provided between the first and second frame sections as shown in FIG. 3.

In order to support the hunter 43 as shown in FIG. 1, a flexible seat 38 extends between the cross member 15 and the cross member 26. The flexible seat material preferably comprises a woven material of sufficient strength to support a person's weight, and is connected to the cross members 15 and 26 by rivets 39 or the like. However, it will be understood that any suitable flexible material of sufficient strength can be utilized. As shown in FIG. 4, shoulder straps 41 and 42 extending from the center of the cross member 15 to the back brace 20 are provided to enable the apparatus 10 to be conveniently carried from tree to tree on the hunter's back. The straps 41 and 42 are buckled to the back brace 20 by means of buckles 45 which can be undone to detach the straps when engaging the apparatus 10 with a tree. Alternately, loops can be formed at the lower ends of the straps 41 and 42 and the brace 20 can be slipped into the loops for transport of the apparatus and slipped out of the loops when the brace 20 is removed from the arms 13 and 14 for closing the first frame section 12 around a tree trunk.

FIG. 4 shows the apparatus 10 in its collapsed position suitable for convenient transport. It should be noted that the flexible seat 38 folds upon itself when the frame sections are telescoped or collapsed to the position shown in FIG. 4. When the hunter reaches a tree that he desires to climb with the apparatus, he removes the apparatus from his back and pulls on the cross member 35 until the third section 32 and the second section 23 are extended out of the tubular arms 13 and 14 to their full extent as shown in FIG. 2. The back brace 20 is then removed from the arms 13 and 14 by removing the straps 41 and 42 and the bolts 21. The apparatus 10 is then moved into position so that the arms 13 and 14 straddle the tree 11 and the cleats 16 and 17 are adjacent to the trunk of the tree. Then the back brace 20 is attached to the arms 13 and 14 by selecting holes 19 that place the back brace 20 adjacent to the trunk of the tree opposite to the cleats 16 and 17 such that the cleats and back brace fit loosely about the tree.

To climb the tree with the apparatus 10, the hunter inserts the toes of his shoes under the cleats 16 and 17, wraps his arms about the trunk of the tree, tilts the apparatus 10 into a horizontal position to unlock it from the tree, and lifts the apparatus 10 upwardly by bending his knees. In the absence of weight on the cleats 16 and 17, the cleats and the back brace 20 will slide up the tree. The hunter then allows the apparatus to tilt into a locking angular position and gradually shifts his weight to his feet while standing upon the cross member 15. This causes the cleats 16 and 17 to bite into the front side of the tree 11, and the back brace 20 to bite into the back surface of the tree. With the apparatus thus secured in position on the tree, the hunter can stand straight up, wrap his arms around the tree at a higher point, and again put his shoes under the cleats 16 and 17 and raise the apparatus further up the trunk of the tree 11. When the hunter raises the cleats 16 and 17, the lever action grip of the apparatus on the tree is released, and the apparatus will slide up the tree.

The hunter thus alternately stands on the apparatus and lifts the apparatus with his feet until the apparatus is at the desired height above the ground. At this time, the hunter stands on the cross member 15 to lock the apparatus 10 in place with respect to the tree. The hunter then turns around and moves his feet to the flexible seat 38, maintaining his arms about the tree until his weight is completely transferred to the seat. The hunter then lowers himself into the flexible seat 38, in a comfortable position as shown in FIG. 1, with his shoulders or head resting against the cross member 15, and his feet resting on the cross member 35. In such position, the center of gravity of the hunter is well away from the tree and below the point where the cleats 16 and 17 bite into the surface of the tree trunk. This provides a strong lever action, causing the cleats 16 and 17 and the back brace 20 to grip the tree firmly and securely, so that there is no danger of the apparatus 10 slipping down the tree and injuring the hunter. The diagonal mounting of the cleats 16 and 17 provides three-point contact with the tree trunk and thus prevents tilting of the apparatus about its longitudinal axis as well as any tendency of the apparatus to rotate about the tree under the hunter's weight.

The flexible seat 38 comfortably supports the hunter in a lounging position in which the hunter can remain motionless for long periods of time so as not to draw the attention of deer passing through the area. The lowered configuration of the seat 38 positions the hunter between the arms 24 and 25, as shown in FIG. 1. Thus, the arms 24 and 25 provide arm rests for the hunter and prevent him from falling sideways out of the apparatus, even if he were to fall asleep. However, the hunter is free to aim his weapon through a large angle without a major change of position. The cross member 15 supports the hunter's shoulders against the recoil of his rifle.

When the hunter desires to leave the tree, he merely raises himself to a standing position in the flexible seat 38 and turns toward the tree, grasping the tree and stepping onto the cross member 15. When he has reached a position facing the tree and standing on the cross member 15, he again wraps his arms around the tree and inserts his shoes under the cleats 16 and 17. He then raises the cleats to release the apparatus 10 from the tree and lowers the apparatus a distance down the tree trunk until his legs are fully extended. He then once again stands upon the cross member 15, locking the apparatus in place on the tree until he can reposition his arms on the tree and once again release the apparatus and lower it an additional distance down the tree. In this manner, the hunter and apparatus progress down the tree until the apparatus is resting upon the ground. Then the back brace 20 is detached from the arms 13 and 14 by removing the bolts 21, and the apparatus 10 is removed from around the tree. The back brace 20 is reattached for carrying and the second and third frame sections 23 and 32 are telescoped back within the adjacent tubular arms until the cross members 26 and 35 are adjacent to the ends of the arms 13 and 14, in the position shown in FIG. 4. The buckles 45 are used to attach the shoulder straps 41 and 42 to the back brace 20. Now the hunter can raise the apparatus 10 onto his back and put his arms through the shoulder straps 41 and 42, and conveniently carry the apparatus as far as desired. Since the seat 38 folds upon itself with the fold extending downwardly, as shown in FIG. 4, other articles the hunter must carry with him can be stowed within the folds of the seat 38 and carried with the apparatus 10 on the hunter's back.

The tubular arms and the cross members are preferably constructed of heavy duty aluminum tubing to provide strength in a lightweight apparatus. It should be noted that the telescoping nature of the attachment between the frame sections provides the largest and strongest tubular members in the tree-gripping frame section 12, which is where the strength is most needed. Although the preferred embodiment of the invention includes telescoping tubular arms that slide into one another as shown in the drawing, it should be understood that other means of collapsibly attaching the second and third frame sections to the tree-gripping frame section could be utilized in order to unfold and support the flexible seat within the scope of the invention.

While this invention has been described in detail with particular reference to a preferred embodiment thereof, it will be understood that variations and modifications can be effected within the spirit and scope of the invention as described hereinbefore and as defined in the appended claims.

I claim:

1. An apparatus for engaging trees and the like for supporting a person above the ground, comprising:
   a first openable frame section surrounding the trunk of a tree and including a first pair of parallel tubular arms joined by an upper tree-engaging member and a lower tree-engaging member, said first frame section gripping said tree upon the exertion of downward pressure on said lower tree-engaging member;
   a second frame section telescopically mounted to said first frame section by a second pair of parallel arms slidably receivable within said first pair of arms and joined by a support member, for selective extension of said support member in a direction away from said tree; and
   a flexible seat suspended between said first frame section and said support member of said second frame section.

2. The apparatus of claim 1 further comprising a third frame section collapsibly mounted to said second frame section for selective extension of a foot support member in a direction away from said tree.

3. The apparatus of claim 1 wherein
   said first frame section includes a first pair of parallel, tubular arms;
   said upper tree-engaging member comprises a removable brace connecting said first arms;
   said lower tree-engaging member comprises a cross member joining said first arms in spaced apart relation intermediate the length of said arms and a pair of diagonal cleats each extending between said cross member and one of said first arms to form a "V" opening toward said tree;
   said second frame section includes a second pair of parallel tubular arms slidably receivable within said first arms for telescoping movement, said support member joining said second arms at the ends thereof farthest from said first arms; and
   said flexible seat comprises woven fabric extending from said cross member to said support member between said first and second arms.

4. An apparatus for engaging trees and the like for supporting a person above the ground, comprising:

a first openable frame section surrounding the trunk of a tree and including a first pair of parallel, tubular arms, an upper tree-engaging member comprising a removable brace connecting said first arms, and a lower tree-engaging member comprising a cross member joining said first arms in spaced apart relation intermediate the length of said arms and a pair of diagonal cleats each extending between said cross member and one of said first arms to form a "V" opening toward said tree, said first frame section gripping said tree upon the exertion of downward pressure on said lower tree-engaging member;

a second frame section collapsibly mounted to said first frame section for selective extension of a support member in a direction away from said tree, said second frame section including a second pair of parallel tubular arms slidably receivable within said first arms for telescoping movement, said support member joining said second arms at the ends thereof farthest from said first arms; and a flexible seat suspended between said first frame section and said support member of said second frame section, said flexible seat comprising woven fabric extending from said cross member to said support member between said first and second arms.

5. The apparatus of claim 4 further comprising a third frame section including a third pair of parallel, tubular arms slidably receivable within said second arms for telescoping movement, and a foot support member joining said third arms at the ends thereof farthest from said second arms.

6. The apparatus of claim 5 wherein said removable brace is attachable to said first arms at a plurality of positions at varying distances from said cleats to accommodate trees of varying diameter.

7. An apparatus for engaging trees and the like for supporting a person above the ground, comprising:

a first openable frame section surrounding the trunk of a tree and including an upper tree-engaging member and a lower tree-engaging member, said first frame section gripping said tree upon the exertion of downward pressure on said lower tree-engaging member;

a second frame section collapsibly mounted to said first frame section for selective extension of a support member in a direction away from said tree;

a flexible seat suspended between said first frame section and said support member of said second frame section; and a third frame section collapsibly mounted to said second frame section for selective extension of a foot support member in a direction away from said tree.

* * * * *